A. Howard, Jr.,
Making Wooden Trays,

N° 38,745.

Patented June 2, 1863.

Witnesses
R. H. Eddy
F. P. Hale Jr.

Inventor.
Ansel Howard Jr

UNITED STATES PATENT OFFICE.

ANSEL HOWARD, JR., OF READSBOROUGH, VERMONT.

IMPROVEMENT IN MACHINES FOR SHAPING WOODEN TRAYS.

Specification forming part of Letters Patent No. 38,745, dated June 2, 1863.

*To all whom it may concern:*

Be it known that I, ANSEL HOWARD, Jr., a citizen of the United States of America, and a resident of Readsborough, in the county of Bennington and State of Vermont, have invented a new and useful machine or invention for the purpose of giving the proper shape to the external surfaces of wooden trays; and I do hereby declare the same to be fully described in the following specification and represented in the accompanying drawings, of which—

Figure 1:
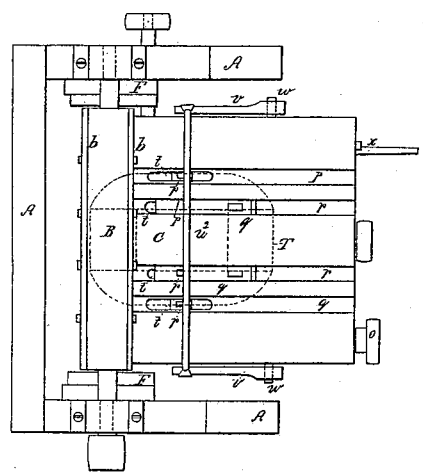
Figure 3:
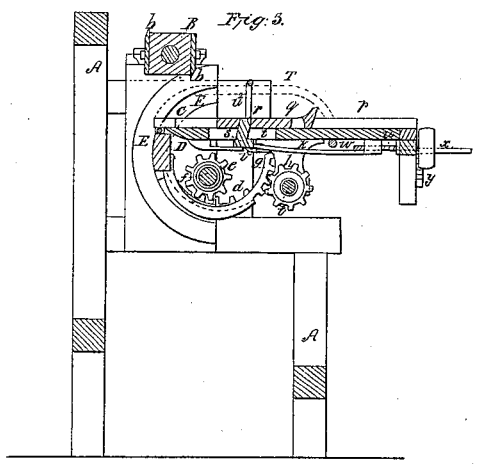
Figure 2:
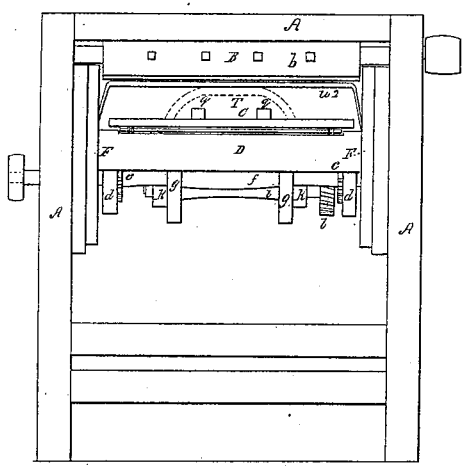
Figure 4:
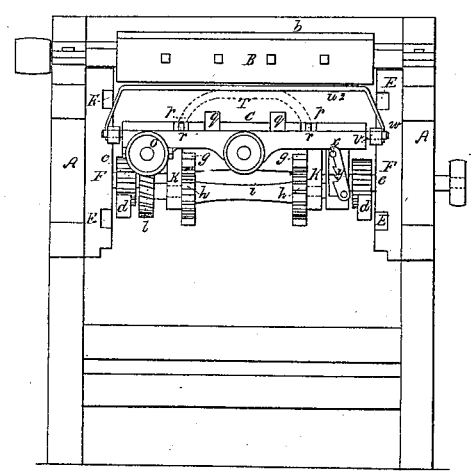

Figure 1 is a top view, Fig. 2 a front elevation, Fig. 3 a longitudinal section, Fig. 4 a rear elevation, and Fig. 5 an under side view, of it.

The nature of my invention consists as follows—viz, in the combination of a separate carrier and its adjustments, or their mechanical equivalent or equivalents, with the tray-platform and the rotary cutter or plane, the whole being applied and arranged with respect to one another in manner and so as to operate substantially as hereinafter explained; also, in the combination of one or more adjustable holdbacks with the platform and the rotary cutter, such holdbacks being for the purpose of preventing the cutter or plane while rotating and while reducing a piece of wood from moving it on or with respect to the platform; also, in the combination of a certain holdfast or tray-clamping mechanism with the platform, when combined with a rotary cutter or plane in manner and for the purpose substantially as herein specified.

The object of my present machine is not only to impart to the external surface of a tray its proper form or shape, or, in other words, to make it with curved sides and ends, and a flat bottom, but to so make it, whatever may be the depth of the tray, that the flat bottom may be tangential to the curve of either or all the sides and ends.

In the drawings, A denotes the frame of the machine, while B is a rotary cutter or plane supported horizontally on the upper part of the frame, and so as to be capable of being put in rapid revolution on its axis. The said rotary cutter consists of a shaft or cutter-head carrying one or more plane irons or long knives, $b\ b$. Under the cutter B is a platform, C, which at its end, which is next adjacent to the cutter, is hinged to a carrier or cross-bar, D, each of whose two ends extends into one of two circular grooves, E E, made in two plates, F F, which are arranged within the frame A, as shown in the drawings. The said carrier, when moved within its guide-grooves E E, moves in the arc of a circle whose center corresponds with that of the arc of either end or side of the outer surface of a tray.

Fig. 6 exhibits a tray in longitudinal section, while Fig. 7 represents it in transverse section; and Fig. 8 is a view of its exterior surface.

In order that the carrier may be moved in its guide-grooves, there is extended from the said carrier two curved racks, $d\ d$, with the teeth of which two gears, $e\ e$, carried by a horizontal shaft, $f$, engage. By revolving the shaft, motion will be imparted to the carrier. There are also two other such racks, $g\ g$, extended from the carrier, the teeth of these latter racks being on their outer curved surfaces. Two pinions, $h\ h$, carried by a shaft, $i$, which is supported by struts $k\ k$, projecting from the under surface of the platform C, engage, respectively, with the racks $g\ g$. Furthermore, there is a worm-gear, $l$, fixed on one end of the shaft $i$. An endless screw, $m$, carried by a shaft, $n$, engages with the said worm, the said shaft being arranged underneath the platform C and supported by struts projecting therefrom. By revolving the shaft $n$ by the hand of a person applied to a circular button or head, $o$, fixed on the shaft, the angle of the platform to the carrier will be more or less varied.

A series of parallel grooves, $p\ p\ p\ p$, is made in the upper surface of the platform and longitudinally thereof. A slider or holdback, $q$, is arranged in each of these grooves, and is so formed as to project above the upper surface of the platform. A projection, $r$, from a frame, $s$, placed underneath the platform, extends through a slot, $t$, on the platform and into the holdback $q$, there being one such projection for each groove $p$. An adjusting-screw, $u$, applied to the platform and screwing into the frame $s$, serves to adjust the position of the frame and those of the holdbacks, the office of such holdbacks having been heretofore stated. The position of the tray when placed on the platform and against the holdbacks is exhibited in the figures at T by red lines.

A holdfast or yoke, $u$, extends over the tray, as shown in the drawings, and serves to confine it down upon the platform. The extremities of the holdfast are jointed to two arms, $v\ v$, extended from the ends of a cross-shaft, $w$, which is supported underneath the platform, and has another arm or handle, $x$, extended from it and being arranged against a catch-rack, $y$, which is arranged with respect to the platform C, as shown in the drawings. By means of the handle $x$, the shaft $w$, and its arms $v\ v$ the holdfast may be forced down upon the tray, so as to hold it firmly in connection with the platform during the process of making the curved end or side of the tray.

Preparatory to dressing or reducing a tray it is to be arranged on the platform in such manner that the end or side to be reduced shall be about even with that end of the platform which is hinged to the carrier. The rotary cutter being put in rapid revolution, we have only to raise the platform at its opposite end, in which case the cutter will cut into the tray in a curved path, the curve of which will have its center coincident with that of the curved guide-grooves of the carrier, and such curve may be caused at its termination with the flat bottom of the tray to have such bottom tangential to it.

By hinging the platform C to a separate carrier, D, and providing the two with adjustments as described, whereby their angular position with respect to each other may be varied, we can, while cutting a curve of a given radius, so adapt the platform to the rotary cutter that whatever may be the depth of the tray (within the limits of the machine) the curves of its sides and ends may be so cut that each or all may be in such a relation to the bottom of the tray that the latter shall be tangential to them.

I claim as my invention—

1. The combination of the separate carrier D and its adjustments $g\ g$, $h\ h$, $i$, $l$, $m$, $n$, or their mechanical equivalent or equivalents, with the platform C and the rotary cutter or plane B, the whole being applied and arranged with respect to one another in manner and so as to operate substantially as specified.

2. The combination of one or more adjustable holdbacks, $q$, with the platform C and the rotary cutter B.

3. The combination of the holdfast $u$ with the platform C, when combined with a rotary cutter, B, the whole being substantially as and for the purpose specified.

ANSEL HOWARD, JR.

Witnesses:
W. H. FOLLETT,
L. A. FOLLETT.